US010621199B2

(12) United States Patent
Mathunny

(10) Patent No.: US 10,621,199 B2
(45) Date of Patent: Apr. 14, 2020

(54) TWO PHASE RETRIEVAL USING NAMED GRAPHS

(71) Applicant: CA, INC., New York, NY (US)

(72) Inventor: John Mathunny, Oakbrook, IL (US)

(73) Assignee: CA TECHNOLOGIES, INC., New York, NY (US)

(*) Notice: Subject to any disclaimer, the term of this patent is extended or adjusted under 35 U.S.C. 154(b) by 289 days.

(21) Appl. No.: 15/681,158

(22) Filed: Aug. 18, 2017

(65) Prior Publication Data

US 2019/0057114 A1    Feb. 21, 2019

(51) Int. Cl.
G06F 15/78      (2006.01)
G06F 16/22      (2019.01)
G06F 16/2455    (2019.01)
G06F 16/27      (2019.01)
G06F 16/901     (2019.01)
H04L 29/08      (2006.01)

(52) U.S. Cl.
CPC .......... G06F 16/27 (2019.01); G06F 15/7867 (2013.01); G06F 16/2255 (2019.01); G06F 16/2455 (2019.01); G06F 16/9024 (2019.01); H04L 67/1002 (2013.01); H04L 67/1008 (2013.01); H04L 67/1095 (2013.01); H04L 67/1097 (2013.01); H04L 67/2842 (2013.01); H04L 67/327 (2013.01)

(58) Field of Classification Search
CPC .. G06F 16/27; G06F 16/9024; G06F 16/2455; G06F 16/2255; H04L 67/1002; H04L 67/327; H04L 67/1095; H04L 67/1008; H04L 67/2842; H04L 67/109
See application file for complete search history.

(56) References Cited

U.S. PATENT DOCUMENTS

| 8,732,118 | B1* | 5/2014 | Cole | G06F 16/254 |
| | | | | 707/607 |
| 9,015,165 | B1* | 4/2015 | Hamm | H04L 67/02 |
| | | | | 707/737 |
| 9,189,509 | B1* | 11/2015 | Tsypliaev | G06F 16/2246 |
| 2003/0158841 | A1* | 8/2003 | Britton | G06F 16/90335 |
| 2006/0235823 | A1* | 10/2006 | Chong | G06F 16/2455 |
| 2007/0185882 | A1* | 8/2007 | Betz | G06F 16/986 |
| 2010/0036862 | A1* | 2/2010 | Das | G06F 16/2255 |
| | | | | 707/698 |
| 2011/0072000 | A1* | 3/2011 | Haas | G06F 16/3323 |
| | | | | 707/709 |

(Continued)

Primary Examiner — Jorge A Casanova
(74) Attorney, Agent, or Firm — Shook, Hardy & Bacon L.L.P.

(57) ABSTRACT

Method and systems for data retrieval is provided. A query is received to search for metric data corresponding to a component of a datacenter, the component of the datacenter identified by a metric instance. An index is searched for the metric instance, the index comprising the metric instance synchronously stored in a flattened format. Further, a slot identification corresponding to the metric instance is determined, the slot identification identifying a location of the metric data in an inventory. Based on the determined slot identification, metric data is retrieved from the inventory, the inventory comprising the metric data asynchronously stored in an unflattened format. Additionally, a query result comprising the metric data corresponding to the search is communicated.

21 Claims, 7 Drawing Sheets

(56) References Cited

U.S. PATENT DOCUMENTS

| | | | | |
|---|---|---|---|---|
| 2013/0238667 A1* | 9/2013 | Carvalho | ............... | G06F 16/27 |
| | | | | 707/798 |
| 2014/0067762 A1* | 3/2014 | Carvalho | ............... | G06F 16/27 |
| | | | | 707/636 |
| 2014/0156633 A1* | 6/2014 | Duan | ............... | G06F 16/24545 |
| | | | | 707/713 |
| 2014/0358949 A1* | 12/2014 | Hu | ............... | G06F 16/20 |
| | | | | 707/754 |
| 2016/0371355 A1* | 12/2016 | Massari | ............... | G06F 16/25 |
| 2016/0380866 A1* | 12/2016 | Taylor | ............... | H04L 47/783 |
| | | | | 709/224 |

* cited by examiner

| Named Graph | Subject | Predicate | Object |
|---|---|---|---|
| Indexgraph#1 | idx#1 | hasIndex | "PRODUCT/SYSVIEW/SYSTEM/CA11/METRIC/CPU_37/CPUID/AA" |
| | idx#3 | hasIndex | "xxx/xxx/sss/sss/" |
| Indexgraph#2 | idx#2 | hasIndex | "PRODUCT/SYSVIEW/SYSTEM/CA31/METRIC/CPU_37/CPUID/AA" |
| | idx#44 | hasIndex | "PRODUCT/SYSVIEW/SYSTEM/CA31/METRIC/CPU_37/CPUID/BB" |
| | idx#45 | hasIndex | "PRODUCT/SYSVIEW/SYSTEM/CA31/METRIC/CPU_37/CPUID/CC" |

*FIG. 3A.*

INVENTORY

| Named Graph | Subject | Predicate | Object |
|---|---|---|---|
| Inventorygraph#1 | inventory#1 | hasMetric | CPU_37 |
| | inventory#1 | hasProduct | SYSVIEW |
| | inventory#1 | hasSystem | CA11 |
| | inventory#1 | hasCpuid | AA |
| | inventory#3 | xxx | xxx |
| | inventory#3 | sss | sss |
| | ... | | |
| Inventorygraph#2 | inventory#2 | a | CPU_37 |
| | inventory#2 | hasProduct | SYSVIEW |
| | inventory#2 | hasSystem | CA31 |
| | inventory#2 | hasCpuid | AA |
| | inventory#44 | .... | .... |
| | inventory#55 | .... | .... |
| | ... | | |

*FIG. 3B.*

TWO PHASE RETRIEVAL USING NAMED GRAPHS

BACKGROUND

Datacenters are large clusters of components (e.g., hardware and/or software resources) that are connected to perform operations using massive amounts of data. Storing and retrieving metrics received from these components is a complex task. In addition, as the amount of data grows, system performance and efficiency becomes paramount. One traditional method is to rely on a NoSQL distributed database management system. However, these systems have a number of associated problems. For example, NoSQL distributed database management systems do not allow for easy onboarding of new components to the datacenter. This is because a redesign of the database is required every time a new component of the datacenter is added. As datacenters continually grow, adding new components to increase capacity within the datacenter, the cost of human resources required to redesign the database increases significantly.

While alternatives to the NoSQL distributed database management systems exist, they too suffer from a number of drawbacks. For instance, these systems rely heavily on expending computing resources, e.g., cache resources. This is especially true for the storage and retrieval of large amounts of data. As usage of large systems and infrastructures increases the amount of data to be stored, it is advantageous to employ methods and systems that allow for the efficient storage and retrieval of data. Even more, enhanced methods and systems are needed to increase the flexibility of onboarding new components to the datacenter without taking the time and expense currently required to re-design the database(s). Attempts have been made to provide a technological solution to overcome these deficiencies, but conventional technology has generally failed to provide an adequate solution. As such, the present disclosure is meant to address the deficiencies of the prior technology.

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of the present disclosure relate to retrieval of metric data corresponding to a component of a datacenter. A query can be received to search for metric data corresponding to a component of a datacenter. The component of the datacenter can be identified by a metric instance. An index comprising a metric instance synchronously stored in a flattened format can be searched. Further, a slot identification corresponding to the metric instance can be determined, where the slot identification identifies a location of the metric data in an inventory. For instance, the slot identification can be generated based on a flattened format of at least a portion of the metric data. Based on the determined slot identification, metric data can be retrieved from the inventory, the inventory comprising the metric data asynchronously stored in an unflattened format.

Additionally, a query result comprising the metric data corresponding to the search can be communicated. Further, the query can be generated using an resource description framework (RDF) query language to retrieve the metric data, which can be stored in an RDF model.

BRIEF DESCRIPTION OF THE DRAWINGS

The present invention is described in detail below with reference to the attached drawing figures, wherein:

FIG. 3A illustrates an exemplary index data structure, in accordance with an exemplary embodiment of the present disclosure;

FIG. 3B illustrates an exemplary inventory data structure, in accordance with an exemplary embodiment of the present disclosure;

DETAILED DESCRIPTION

Figure 1:
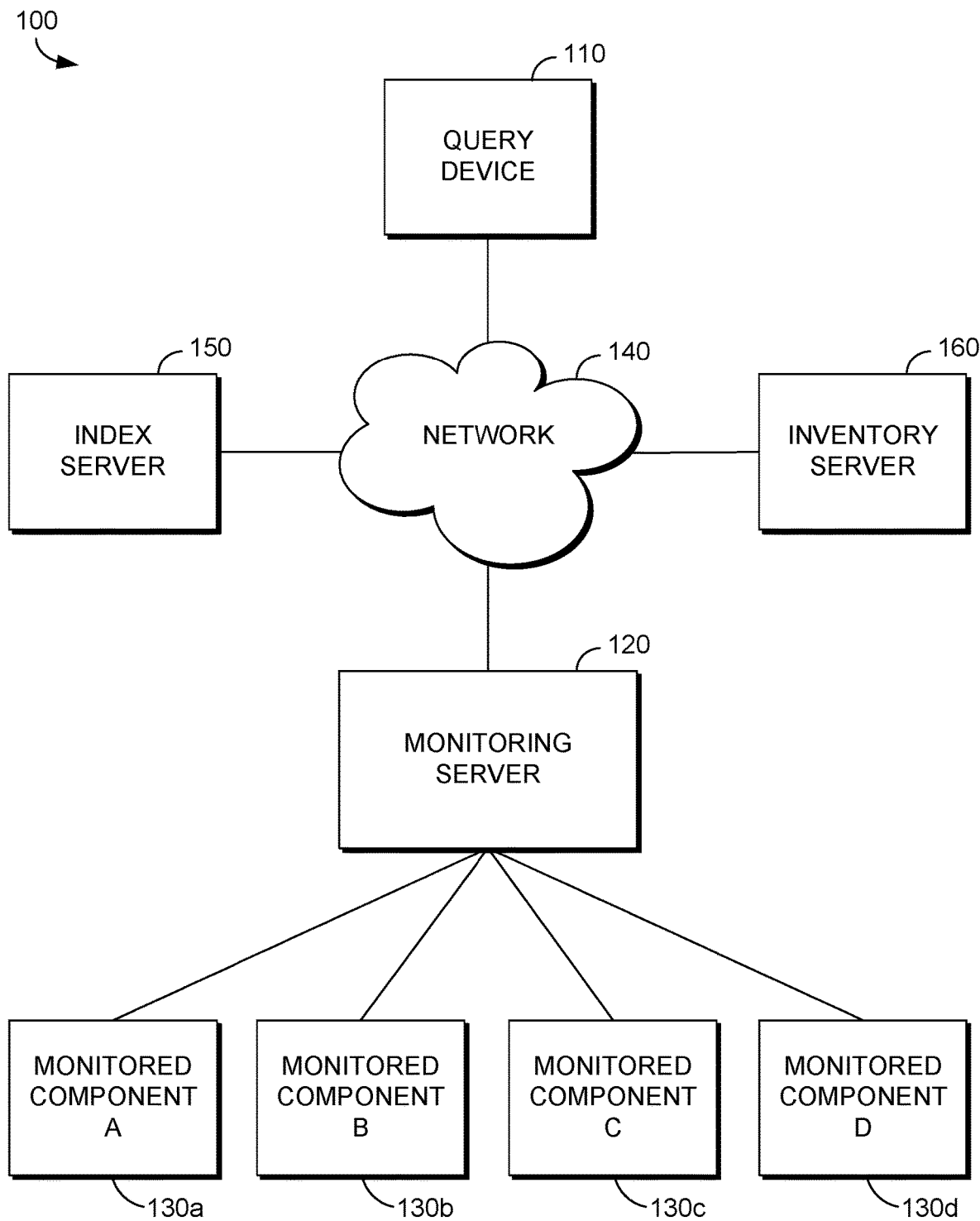
FIG. 1 is a block diagram of an exemplary system for storing and retrieving metric data, in accordance with an embodiment of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. For example, although this disclosure refers to storing and retrieving data related to datacenters in illustrative examples, aspects of this disclosure can be applied to all types of data. Moreover, although the terms "step" and/or "block" may be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

The term "component" as used herein encompasses both hardware and software resources. The term component may refer to a physical device such as a computer, server, router, etc., a virtualized device such as a virtual machine or virtualized network function, or software such as an application, a process of an application, database management system, etc. A component may include other components. For example, a server component may include a web service component which may include a web application component.

As previously set forth in the Background, datacenters are large clusters of components (e.g., hardware and/or software resources) that are connected to perform operations using massive amounts of data. Efficient storage and retrieval of metric data related to these datacenters is important in maintaining the efficiency of the datacenter itself. Metrics or metric data may include, by way of example only, the temperature of datacenter components, workload, network usage, processor capacity, and the like. Although a plurality of components of a data center is referred to herein, embodiments may be employed in storing or retrieving metric from a single component of a data center.

As the amount of datacenter components grow, so too does the metric data. The vast amount of metric data causes a number of complications in the storage and retrieval process of that data, often sacrificing time for efficiency or vice versa. While conventional approaches attempt to decrease the amount of time to store or retrieve data, they do so at the cost of requiring a greater amount of computing resources, such as a computer's cache memory. This is generally inadequate as computing resources are limited. While alternative approaches may attempt to preserve computing resources, these approaches sacrifice timely storage and/or retrieval of the data making these alternative approaches generally inadequate. By employing the present embodiments, the time required to store and retrieve metric data is decreased while also conserving computing resources.

In addition, components of the datacenter frequently change, as components are on-boarded and/or off-boarded from the datacenter. For example, new components may be added to the datacenter to meet the current demand of the datacenter. This significantly impacts the type of data structure used to store and retrieve metric data. One conventional approach relies on Apache's Cassandra, which is in open source NoSQL distributed database management system. As such, Cassandra may be well suited to handle vast amounts of data, but the onboarding of new datacenter components require a substantial redesign of the database. The time required to redesign the system can make a NoSQL distributed database system, like Cassandra, impractical. Hence, new methods and systems of storage are needed to overcome the deficiencies of conventional database storage. In particular, improved methods and systems are needed to reduce both the time and computing resources required for the storage and retrieval of large amounts of data.

In a first embodiment of the present disclosure, a method for data retrieval is provided. The method includes receiving a query to search for metric data corresponding to a component of a datacenter, the component of the datacenter identified by a metric instance. The method also includes searching an index for the metric instance, the index comprising the metric instance synchronously stored in a flattened format. Further, the method includes determining a slot identification corresponding to the metric instance, the slot identification identifying a location of the metric data in an inventory. Based on the determined slot identification, the method includes retrieving the metric data from the inventory, the inventory comprising the metric data asynchronously stored in an unflattened format. Additionally, the method includes communicating, to the query device, a query result comprising the metric data corresponding to the search.

In another embodiment, a computerized system is provided. The computerized system comprises a processor; and a computer storage medium storing computer-useable instructions that, when used by the processor, cause the processor to receive a query to search for metric instance corresponding to a component of a datacenter, the component of the datacenter identified in the query by the metric instance. The system also communicates the query to an index comprising the metric instance synchronously stored in a flattened format. Additionally, the system determines a slot identification utilizing at least a portion of the metric instance. The system also communicates the query to an inventory comprising the metric data asynchronously stored in an unflattened format, the slot identification identifying the location of the metric data in the inventory. In addition, the system communicates a query result comprising the metric data corresponding to the query.

In still another embodiment, a computer storage medium storing computer-useable instructions that, when used by a computing device, cause the computing device to perform operations, the operations comprising receiving a query to search for metric data corresponding to a component of a datacenter, the component of the datacenter identified in the query by a metric instance. The operations further include communicating the query to an index comprising the metric instance synchronously stored in a flattened format. In addition, the operations include determining a slot identification utilizing at least a portion of the metric instance. The operations also include communicating the query to an inventory comprising the metric data asynchronously stored in an unflattened format, the slot identification identifying the location of the metric data in the inventory. Further, the operations include receiving a query result comprising the metric data corresponding to the query.

Referring initially to FIG. 1, an environment for storing and retrieving metric data is illustrated in accordance with an embodiment of the present disclosure. The system 100 may comprise an index server 150, an inventory server 160, and a monitoring server 120. The index server 150, an inventory server 160, and a monitoring server 120 may communicate with each other via a network 140. The network 140 may include, without limitation, one or more local area networks (LANs) and/or wide area networks (WANs). Such networking environments are commonplace in offices, enterprise-wide computer networks, intranets, and the Internet. It should be understood that any number of datacenters and/or database servers may be employed by the system 100 and is within the scope of the present disclosure. Each may comprise a single device or multiple devices cooperating in a distributed environment. Additionally, other components (e.g., a monitored component 130) may also be included within the network environment. It should be appreciated that while the index server 150, the inventory server 160, and the monitoring server 120 are described as separate servers communicating over the network 140, embodiments of the present disclosure may be employed by a single server.

A number of monitored components in system 100 communicate with the monitoring server 120. As shown in FIG. 1, system 100 comprises monitoring components 130*a-d* where each of the monitoring components 130*a-d* are in communication with the monitoring server 120. The monitored components 130*a-d* are each associated with metric data representing the properties of the component of the datacenter at any given point in time. It should be appreciated that although four monitored components are depicted, the number of monitored components can change. As mentioned, embodiments of the present disclosure allow for the ease and flexibility of onboarding new monitored components without the manual re-design of the database structure.

The monitored components 130*a-d* may communicate metric data corresponding to each of the monitored components 130*a-d*. The monitoring server 120 may receive the metric data via a network, such as network 140. The metric data may correspond to a temperature of the monitored component 120, workload, network usage, processor capacity, and the like. Additionally, the metric data may comprise and/or be associated with a metric instance identifying the component of the datacenter (e.g., monitored components 130*a-d*). The metric data and/or the metric instance may include one or more metric parameters having one or more corresponding metric values. For example, the metric instance may identify monitored component 130 by a metric parameter of "System" and a corresponding metric value of "CA11." The metric instance may be further identified by a series of metric parameters and metric values. For instance, in addition to a metric parameter of "System" and a corresponding metric value of "CA11," the metric instance may further be identified by the metric parameter of "Metric" and a corresponding metric value of "CPU_37." Accordingly, monitored components 130*a-c* may be identified by one or more metric parameters and one or more metric values.

As mentioned, the monitoring server 120 can be in communication with the index server 150 via the network 140. The index server 150 may be a server storing an index, such as the index illustrated in FIG. 3A. In one aspect, the index comprises a flattened format of at least a portion the metric instance. Although discussed in greater detail below, the flattened format of the metric instance can be achieved, for example, by flattening the relationship between the metric parameters and metric values. For illustrative purposes, FIG. 3A depicts a flattened format of at least a portion metric instance at element 320.

In one embodiment, the index and/or the inventory can be stored in a resource description framework (RDF) model. Data can be modeled in the RDF model based on making statements comprising a subject, an object, and a predicate (relationship) between them, commonly referred to as a triple. The subject and object can each denote a resource while the predicate can identify a relationship between the two. Each triple can be stored in a graphical structure, such as an RDF graph, or in a database management system, such as a triplestore. A number of RDF triple store systems exist for storing and retrieving RDF models, including 4store, Boca, Apache's Jenna, Kowari, OWLIM, RDFStore, and the like. Additionally, each triple can be assigned an identifier, such as, an internationalize resource identifier (IRI) and/or a uniform resource identifier (URI). Even more, two or more sets of triples may be grouped together as a named graph. Though discussed in greater detail below with reference to FIGS. 3A-B, the index and/or the inventory may be stored in an RDF model.

In an exemplary embodiment, the metric data can be synchronously stored in the index. Alternatively or additionally, the metric instance can be stored in the index server 208 using a synchronous data transfer protocol. The synchronous transmission of the metric data comprises a continuous stream of the metric data, where both the transmitting server (e.g., the monitoring server 120) and the receiving server (e.g., the index server 150) operate under the same clock. In one embodiment, an external clocking mechanism may ensure that both the sending and receiving servers are synchronized. In another embodiment, the transmitting server provides a clock signal to the receiving server. Although FIG. 1 depicts the index server 150 as receiving the metric data from the monitoring server 120, the index server 150 may also receive the metric data directly from the monitored component 130. By synchronously transmitting the metric data, large amounts of data can be transferred quickly since it allows for large blocks of data to be transferred. In addition, the synchronous transmission ensures that the metric data is not corrupted since the transmission utilizes the clocking signal.

With continued reference to FIG. 1, after receiving the metric data, index server 150 can search the index to determine whether the metric instance that corresponds to the metric data already exists in the index. In one embodiment, the index server 150 searches the index and determines the metric instance does not exist. Accordingly, the index server 150 can create a new entry in the index for the received metric instance. In the event the metric instance is found, the instance ID (also known as the metric instance ID) and/or the flattened format of the metric instance may be returned.

The metric data and/or the metric instance can also be stored in an inventory corresponding to the index. In an exemplary embodiment, the metric data and/or the metric instance can be asynchronously stored at an inventory server 160. In one embodiment, it is determined that the asynchronously storage of the metric data has failed. As such, an alternate batch strategy may be used to filter out bad data.

As such, the inventory server 160 can receive transmission signals comprising the metric data from one or more external systems (e.g., the monitoring server 120, the monitored component 130, and/or the index server 150) in an asynchronous manner. Asynchronous transmission allows the metric data and/or the metric instance to be transmitted at intermittent intervals as opposed to requiring a steady data stream. Because asynchronous transmission does not require the transmitting and receiving servers to be synchronized with a clock signal, data may be transmitted intermittently. Accordingly, asynchronous transmission is more flexible. This allows for greater efficiency in the system 100 as the both the transmitting and receiving servers may communicate based on available resources.

In one embodiment, the inventory can store metric data and/or the metric instance based, at least in part, on the metric and/or the metric instance stored in the index. For example, in the event of a disaster, where the metric instance in the inventory is lost, the inventory may be restored based on the metric instance stored in the index. As discussed above, the metric instance can be synchronously stored in a flattened format on the index, which provides reliability and speed offered by the synchronous transmission of the metric data. The metric data and/or the metric instance may then be asynchronously stored in the inventory server 160 based on the metric instance stored in the index. This provides greater efficiency in the system 100 since the transmission can be transmitted intermittently, such as, when the bandwidth or server's computing resources are available. In addition, since the index comprises a flattened format of the metric data, if at any point the asynchronous storage of the metric data in the inventory fails (e.g., one or more of the packets containing the metric data is lost or corrupted), the inventory server 160 can request that the index server 150 transmit the metric data that was lost or corrupted. Accordingly, embodiments can combine the advantages of synchronous storage of the metric instance in the index with the advantages of asynchronous storage of the metric data and/or the metric instance in the inventory to maximize both the time and efficiency of data storage and retrieval.

In an exemplary embodiment, the metric data can be stored in the inventory in an unflattened format. For instance, the metric data and/or the metric instance can be stored in the inventory server 160 and capture the complex relationships between metric parameters and metric values. Storing the metric data and/or the metric instance in the unflattened format may enhance a subsequent query so as to capture the relationships contained within the metric data and/or the metric instance. In addition, the unflattened format of metric instance may be presented in tabular format where the metric parameters and metric values can be organized in rows and columns, as discussed in more detail below with reference to FIG. 3B.

As mentioned, in one embodiment, the inventory may correspond to the index. For instance, the slot identification may identify a particular inventory to be queried. The slot identification may identify, for example, a server (IP address and port), an inventory database, and/or a URI to be queried. In an exemplary embodiment, the slot identification may be associated with both the index URI and the inventory URI. For example, referring to FIGS. 3A-B, both the index URI 302 and the inventory URI 308 can be associated with the slot identification. The slot identification may preserve computing resources and reduce search time because the slot identification can allow for a direct query of the particular inventory associated with the target metric data to be queried, as opposed to a general query of all inventories.

In one aspect, the slot identification can be generated based on at least a portion of the metric instance. The slot identification can be generated by applying a hash function to at least a portion of the flattened metric instance. For example, the flattened metric instance of Product/DB2TOOLS/Metric/CPU_37/System/XE61/C1quid/C1quid-324/C2puid/C2puid-14/ZosCPU/N42 can be used as the input to the hashing function. In one embodiment, the slot identification may be generated by hashing at least a portion of the metric instance. The hashing function can then output the slot identification. The slot identification may then be used to store and/or query the metric data in a corresponding inventory.

Any suitable hashing algorithm may be used to map the flattened metric instance to the slot identification. In one exemplary embodiment, consistent hash technology can be used to generate the slot identification. Consistent hash functions allow for the balancing of workloads in a distributed network. Consistent hash functions also allow for the addition and removal of slots without remapping the slot identifications stored in the remaining slots. In one aspect, the consistent hash function may generate the slot identification based on the hashing input (e.g., a value of the flattened metric instance) and the number of slots and/or buckets. In an example embodiment, Google's Guava consistent hash function can be used to generate the slot identification. Accordingly, the slot identification may be generated using the command Hashing.consistentHash(xx, slot), where "xx" represents the flattened format of at least a portion of the metric instance, and where "slot" can be any number of slots available across a key space. For instance, the slot identification may be retrieved through the following hash command: Hashing.consistentHash(Product/DB2TOOLS/Metric/CPU_37/System/XE61/C1quid/C1quid-324/C2puid/C2puid-14/ZosCPU/N42, 2000).

In embodiments, once the metric data is stored, it can be subsequently retrieved by the query device 110. The query device 110 may be any computing device, such as computing device 600. The query device 110 may access the index server 150 and/or inventory server 160 through the network 140. In conventional technologies, querying a large database and retrieval of data therein required large amounts of computer resources, such as, the computer's cache memory. However, current embodiments overcome these drawbacks.

In one embodiment, a query may be received from the query device 110. The query may be generated in a query language and protocol to retrieve metric data corresponding to a component of a datacenter. Multiple query languages and protocols exist for querying and manipulating RDF models, including SPARQL Protocol and RDF Query Language (SPARQL) (as discussed below), SquishQL, RQL, RDQL, RDFQL, and the like. These query languages can be supported by one or more application programming interfaces (API), such as, Jena (Apache), Sesame (Aduna), and Boca (IBM).

In an exemplary aspect, the query device 110 generates a query using SPARQL. SPARQL can be used to generate queries that detect graph pattern matching to more complex queries, including union, optional query parts, and filters. Further, SPARQL can support one or more exchange formats, such as, JavaScript Object Notation (JASON), Extensible Markup Language (XML), Comma Separated Values (CSV), and Tab Separated Values (TSV). An exemplary query statement can include:

```
PREFIX rdf: <http://www.w3.org/1999/02/22-rdf-syntax-ns#>
PREFIX z: <http://ca.com/zsystem/0.1/>
PREFIX owl: <http://www.w3.org/2002/07/owl#>
PREFIX rdfs: <http://www.w3.org/2000/01/rdf-schema#>
SELECT *
WHERE
{
    graph ?graph { ?inventory a z:CPU__37 .}
}
```

In one embodiment, the query can be generated to search the index, which can be stored on the index server 150. In an exemplary aspect, the generated query may be received at the index server 150 from the query device 110, via the network 140. The query can comprise partial or full information to identify the target metric instance and/or target metric data. For instance, the query may include a search of the metric parameter (e.g., "C1puid") or the metric value (e.g., "CA11"). The query can thus retrieve the flattened format of at least a portion the metric instance. For instance, the query may retrieve the following flattened format of the metric instance: "Product/DB2TOOLS/Metric/CPU_37/System/XE61/C1puid/C1puid-324/C2puid/C2puid-14/C3puid/C3puid-319/ZosCpu/N42."

According to embodiments, the slot identification corresponding to the metric instance may be determined. The slot identification can be used to identify a location of the metric data in the inventory. As discussed above, the slot identification may be determined by applying a hash function to at least a portion of the metric instance. For instance, the flattened format of at least a portion of the metric instance (e.g., "Product/DB2TOOLS/Metric/CPU_37/System/XE61/C1puid/C1puid-324/C2puid/C2puid-14/C3puid/C3puid-319/ZosCpu/N42") may be hashed to determine the slot identification. In an exemplary embodiment, as discussed above, a consistent hash function can be used to determine the slot identification. The slot identification may be determined by any computer component of the system 100, including the index server 150 and/or the query device 110. For example, the index server 150 may communicate the flattened format of the metric instance to the query device 110, which determines the slot identification. Alternatively or additionally, the index server may determine the slot identification, which can then be communicated to the query device 110.

Based on the slot identification, metric data stored in the inventory can be retrieved according to embodiments herein. As discussed above, the slot identification may be used to locate the metric data, for example, by identifying a particular inventory server (e.g., IP address and port number), a particular inventory database, and/or a particular URI associated with the metric data and/or the metric instance. Once the location of metric data is identified, the metric data may be retrieved. This may be achieved, for example, through a second query, where the second query comprises a targeted query that identifies the particular inventory comprising the metric data. Accordingly, in one embodiment, the query device 110 modifies the query and communicates the query to the inventory server 160, which then retrieves the metric data and communicates the metric data to the query device 110. As discussed above, the inventory may comprise at least a portion metric data and/or the metric instance in an unflattened format, so the inventory server 160 may retrieve the unflattened metric data and communicate it to the query device 110. Retrieving the unflattened format of the metric data from the inventory is advantageous because the unflattened format can represent the relationship between the one or more metric parameters and the one or more metric values. The inventory server 160 can thus communicate, to the query device 110, a result of the query that comprises the unflattened metric data and/or the metric instance corresponding to the search. It should be appreciated that utilizing the index to identify the location of the inventory conserves computing resources.

In one embodiment, a single read may be executed in the query. In an exemplary aspect, the query may be received from the query device at either the index server and/or inventory server via a Hypertext Transfer Protocol (HTTP) call. Upon receiving the query, a transaction may be started in a new thread with the intention to read. The target data of the query (e.g., the metric data stored in the inventory) can then be read. Once complete, the transaction can be closed. The target data can be formatted (e.g., flattened) for communication through the network 140. The query device 110 can receive the query of the target data through the network 140, convert the target data (e.g., unflatten), and then read the target data.

In one embodiment, metric data and/or metric instance may be updated and/or retrieved in a batch request. For instance, the query may comprise the batch request to retrieve two or more sets of target data. Accordingly, the query device 110 can communicate the query to the target server (e.g., the inventory server 160 and/or the index server 150) with the intention to read the two or more sets of target data. A single transaction can be started in a new thread with the intention to read and/or store as a batch. Once complete, the transaction can be closed. The two or more sets target data can be formatted (e.g., flattened) for communication through the network 140. The query device 110 can then receive the query result, convert the two or more sets target data (e.g., unflatten), and then read the two or more sets target data. It is foreseen that the metric data and/or metric instance can be uploaded from the monitoring server 120 to the index server 150 and/or inventory 160 using the batch request. Executing the update and/or query using the batch request offers efficiencies in both time and computing resources as two or more read requests may occur in a single HTTP call.

In another embodiment, the system 100 may comprise servers enabled with a binary serialization protocol. As such, the query and/or storage of metric data can be communicated over the network 140 utilizing in a compressed, binary format. Cross-language serialization frameworks including, but not limited to, Thrift, Avro, and/or Protocol Buffers, can be utilized to serialize the text-based format of HTTP into a binary format. Because storing and retrieving RDF models can rely on the HTTP protocol, the required bandwidth for storing and/or retrieving metric data in the RDF model can be reduced by utilizing the binary protocol.

Figure 2:
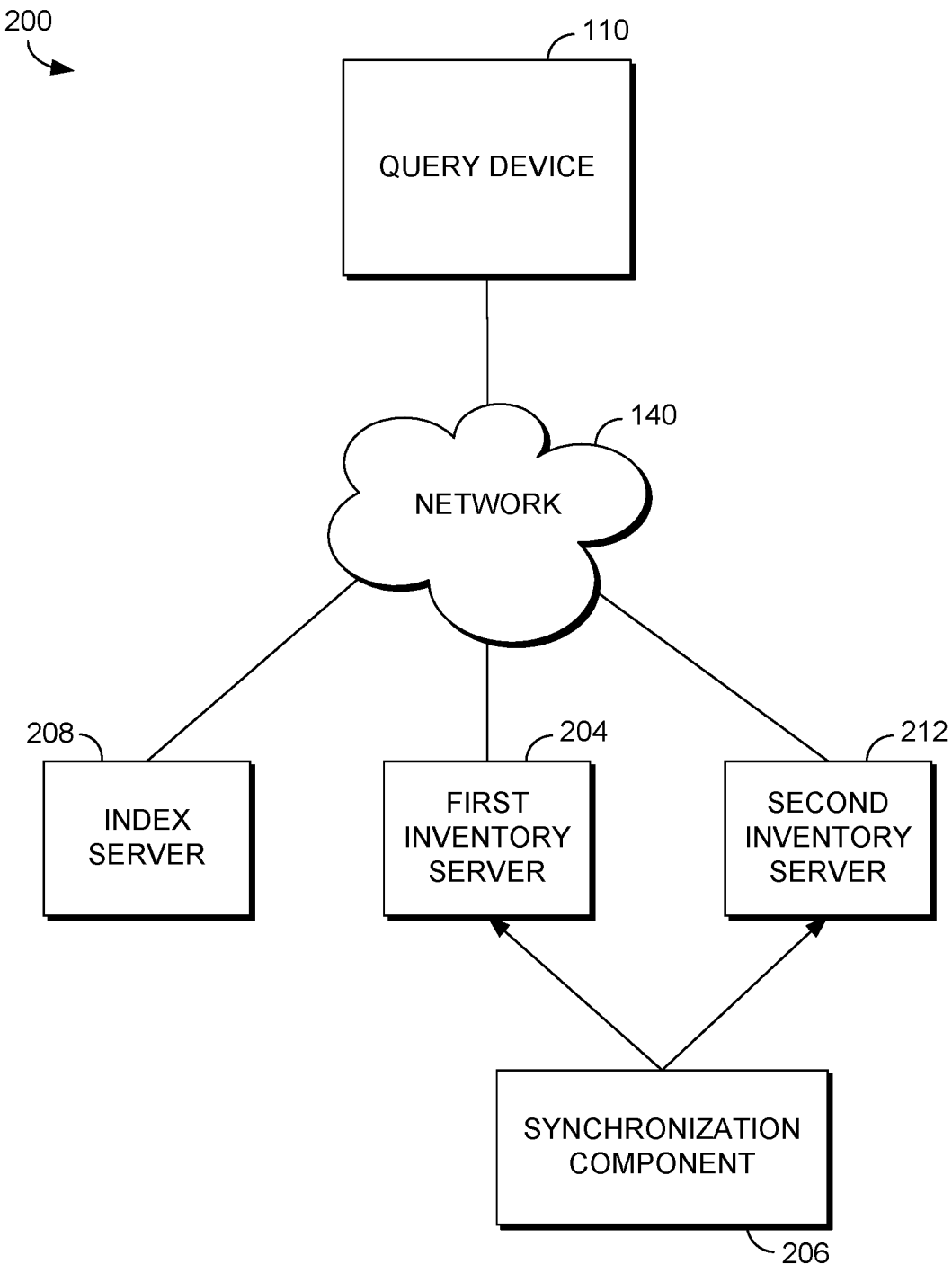
FIG. 2 is a block diagram of an exemplary distributed environment, in accordance with an embodiment of the present disclosure.

Turning now to FIG. 2, an exemplary distributed environment is illustrated in accordance with an embodiment of the present disclosure. Generally the system 200 comprises the query device 110 that is in communication, via the network 140, with multiple endpoints, including the index server 208, a first inventory server 204, and a second inventory server 212.

As shown, in embodiments, the inventory can be stored at first and second inventory servers 204 and 212 in system 200. Accordingly, a query may be generated to search multiple endpoints (e.g., one or more index servers and/or one or more inventory servers). In one embodiment, SPARQL Federated Query is utilized by the query device 110 to query metric data stored at multiple endpoints. Federated Query is an extension of SPARQL and can join returned data from multiple endpoints. In one aspect, the query can be generated to retrieve metric data at the first inventory server 204 and the second inventory server 212. Hence, embodiments can combine the metric data from both the first inventory server 204 and the second inventory server 212. For instance, target metric data for CPU_37 may be stored on a first inventory server 204 while target metric data for CPU_45 may be stored in a second inventory server 212. By utilizing SPARQL Federated Query, the target metric data for CPU_37 from the first inventory server 204 may be retrieved along with the target metric data of CPU_45 from the second inventory server 212.

In one embodiment, the metric data and/or metric instances may be synchronized between the first inventory server 204 and the second inventory server 212. The system 200 may comprise a synchronization component 206 that can manage the partitioning and/or retrieval of the metric data and/or metric instances across a distributed architecture of the system 200, including the first inventory server 204 and the second inventory server 212. In one aspect, the synchronization component 206 comprises an in-memory data grid (IMDG) component (Hazelcast, Apache Ignite, Pivotal Gemfire, Infinispan, Ehcache, and the like) to provide an object-oriented structure that avoids the inefficiencies of a relational database structure. Even more, the data grid can be easily scaled compared to traditional methods. Additionally or alternatively, the synchronization component 206 comprises a distributed coordination component (Apache Zookeeper, Consul, etc., and the like), which provides coordination between a cluster of nodes. In one embodiment, the synchronization component 206 may synchronize the first inventory server 204 with the second inventory server 212. For instance, the first inventory server 204 with the second inventory server 212 may be synchronized by replicating the metric data and/or metric instances across the servers. As such, the query received from the query device 110 can be load balanced between the first inventory server 204 and the second inventory server 212 by way of a load balancing server.

Still, in a further embodiment, the synchronization component 206 may coordinate the partitioning of the inventory/index across the distributed environment. For example, the synchronization component 206 may partition a first inventory at the first inventory server 204 and a second inventory at the second inventory server 212. As such, the query can be communicated to the appropriate inventory server comprising the target metric data. For instance, the query can be communicated to the first inventory server 204 to retrieve target metric data that is stored within the first partition. Alternatively, the query can be communicated to the second inventory sever 212 to retrieve target metric data that is partitioned at the second inventory server 212. It should be appreciated that, in the same way, the synchronization component 206 can synchronize two or more index servers (not shown).

Referring now to FIG. 3A, an exemplary index data structure is illustrated in accordance with an exemplary embodiment of the present disclosure. It should be appreciated that the index data structured is depicted in a tabular format for illustrative purposes. In one embodiment, the index can be stored using the RDF model. The metric instance in the index can be modeled in the RDF model based on an index triple comprising an index subject 330, an index object 350, and an index predicate 340. The index subject 330 and index object 350 can each denote a source while the index predicate 340 can identify a relationship between the two. In one embodiment, the index triple may comprise a flattened format of the metric instance.

The index subject 330 can denote the particular resource stored in the index. For example, the index subject 330 may identify an instance ID 318 that is specific to the metric instance. The instance ID may start with one and atomically increase as new metric instances arrive. The instance ID 318 may be used to determine whether the metric instance exists in the index. For example, if metric data for a particular metric instance is received, the instance ID 318 of the metric instance may be used to determine whether an entry for the metric instance exists within the index. If the index does not contain an entry, one may be created for the metric instance. Additionally or alternatively, in one embodiment, the index subject 330 can incorporate the instance ID 318. As shown, the index subject "idx #1" can incorporate the instance ID (simplified as "1"). It should be appreciated that the instance ID 318 may include any combination of letters, numbers, and or symbols to identify the metric instance.

Continuing, the index predicate 340 identifies a relationship between the index subject 330 and the index object 350. In one aspect, the index predicate 340 can be "hasIndex." As such, the index subject 330 (e.g., "idx #1") can have a relationship (e.g., "hasIndex") with the index object 350.

The index object 350 can identify resource having a relationship to the resource associated with the index subject 330. For instant, in one embodiment, the index object 350 may comprise the flattened format of at least a portion of the metric instance that is related to the index subject 330. The flattened metric instance may include, for example, one or more metric parameters and corresponding one or more metric values. The one or more metric parameters can generally relate to a nomenclature and/or framework used to identify individual components in the datacenter. Each metric parameter can therefore have a corresponding metric value to identify a particular component in the datacenter. As illustrated, the metric instance may be identified by one or more metric parameters (e.g., System represented by Element 306) and one or more metric values (e.g., CA11 represented by Element 312). Any number of metric parameters and metric values may be used as to represent the metric instance associated with and/or included in the metric data so as to identify the component of the datacenter.

In one embodiment, one or more index triples can be grouped together and stored as one or more index named graphs. Each index named graph can be associated with an index identifier, such as, an IRI and/or URI. In one embodiment, one or more index triples may be identified by an index URI 302. Additionally or alternatively, the index URI 302 may be associated with the slot identification. As illustrated in FIG. 3A, the index URI 302 (simplified as "indexgraph #1") may incorporate the slot identification (simplified as "1"). The slot identification may be any string of alpha-numeric characters and/or symbols, and can be determined according to embodiments described herein.

In another embodiment, the one or more index triples may be stored in a triplestore that is structured on the RDF model. For instance, the one or more index triples may be stored in a triplestore or a quad store including, but not limited to, a TDB dataset, which is offered in Apache Jena.

With reference to FIG. 3B, an exemplary inventory data structure is illustrated according to embodiments of the present disclosure. It should be appreciated that the inventory data structured is depicted in a tabular format for simplicity. In embodiments, the inventory can be stored using the RDF model. In one aspect, at least a portion metric data and/or the metric instance can be stored in the inventory in a non-flattened format utilizing the RDF model, which can reduce the need for expending cache resources of the server during storage and retrieval. The metric data and/or the metric instance in the inventory can be modeled in an RDF database based on triples (also referred to as a statement) comprising an inventory subject 360, an inventory object 310, and an inventory predicate 370. In one embodiment, the unflattened format of the metric instance may be captured by one or more RDF triples.

The inventory subject 360 can denote a particular resource stored in the inventory. As shown in FIG. 3B, in one embodiment, the inventory subject 330 can identify a resource of "inventory #1," where '1' represents the instance ID 318. Although depicted as a single integer, the instance ID 318 may be any string of alpha-numeric characters and/or symbols. As shown, in one embodiment the same instance ID 318 is used for both the index subject 330 and inventory subject 360 that are associated with the same metric instance.

The inventory predicate 370 identifies a relationship between the inventory, subject 360 and the inventory object 310. In one embodiment, the inventory predicate 370 can denote the metric parameter of the metric instance. For example, the inventory predicate 370 may denote metric parameters such as "hasMetric," "hasProduct," "hasSystem" "hasCPuid," and the like.

As mentioned, the inventory object 310 can denote a resource having a relationship with the resource associated with the inventory subject 360. In one embodiment, the metric values can be stored as the inventory object 310. As shown in FIG. 3B, the unflattened metric instance can be stored as an inventory triple (also referred to as an inventory statement) to capture unflattened relationship between the metric parameter and the metric value. For instance, the metric parameter may be identified using the inventory predicate 370 and the metric value may be identified using inventory object 310. Even more, one or more inventory triples may be utilized for capturing the relationship between a plurality of metric parameters and their corresponding metric values. For instance, the metric instance can be stored in a plurality of inventory triples having the same subject (e.g., "invetory #1"), yet having distinct inventory predicates 370 and inventory objects 310 identifying the metric parameter (e.g., "hasSystem") and the metric value (e.g., "CA11"), respectively.

In one embodiment, the metric data and/or metric instance can be temporarily stored as an n-quad and subsequently removed upon a successful asynchronous storage of the metric data and/or the metric instance in the inventory. N-quads can be a line-based, plain text format for encoding an RDF dataset that can be imported into the RDF model. As such, N-quad statements can be a line-based sequence of the inventory subject 360, inventors object 310, the inventory predicate 370, and the inventory identifier (such as the inventory URI 308).

Inventory triples may be grouped into one or more inventory named graphs that are associated with an inventory identifier, such as, an IRI and/or a URI. In one embodiment, one or more inventory triples may be identified by an inventory URI 308. As shown, one or more metric instances may be associated with a single inventory URI 308. That is, a first metric instance associated with inventory #1 and a second metric instance associated with inventory #3 may be stored in single inventory named graph associated with the single inventory URI 308.

Additionally or alternatively, the inventory URI 308 may be associated with the slot identification. As illustrated in FIG. 3B, in one embodiment, the inventory URI 308 (simplified as "inventorygraph #1") may incorporate the slot identification, "1." Although depicted as a single integer, the slot identification may be any string of alpha-numeric characters and symbols, and can be determined according to embodiments described herein. Accordingly, in addition to the inventory URI 308, the slot identification may also be utilized to determine the location of the unflattened metric data and/or the metric instance in the inventory 301. It should be appreciated that, in embodiments, the slot identification associated with index URI 302 can be the same as the slot identification associated with the inventory URI 308.

In another embodiment, the one or more inventory triples may be stored in a triple store that is structured on the RDF model. For instance, the one or more inventory triples may be stored in a triplestore and/or quad store including, but not limited to, a TDB dataset offered in Apache Jena.

Figure 4:
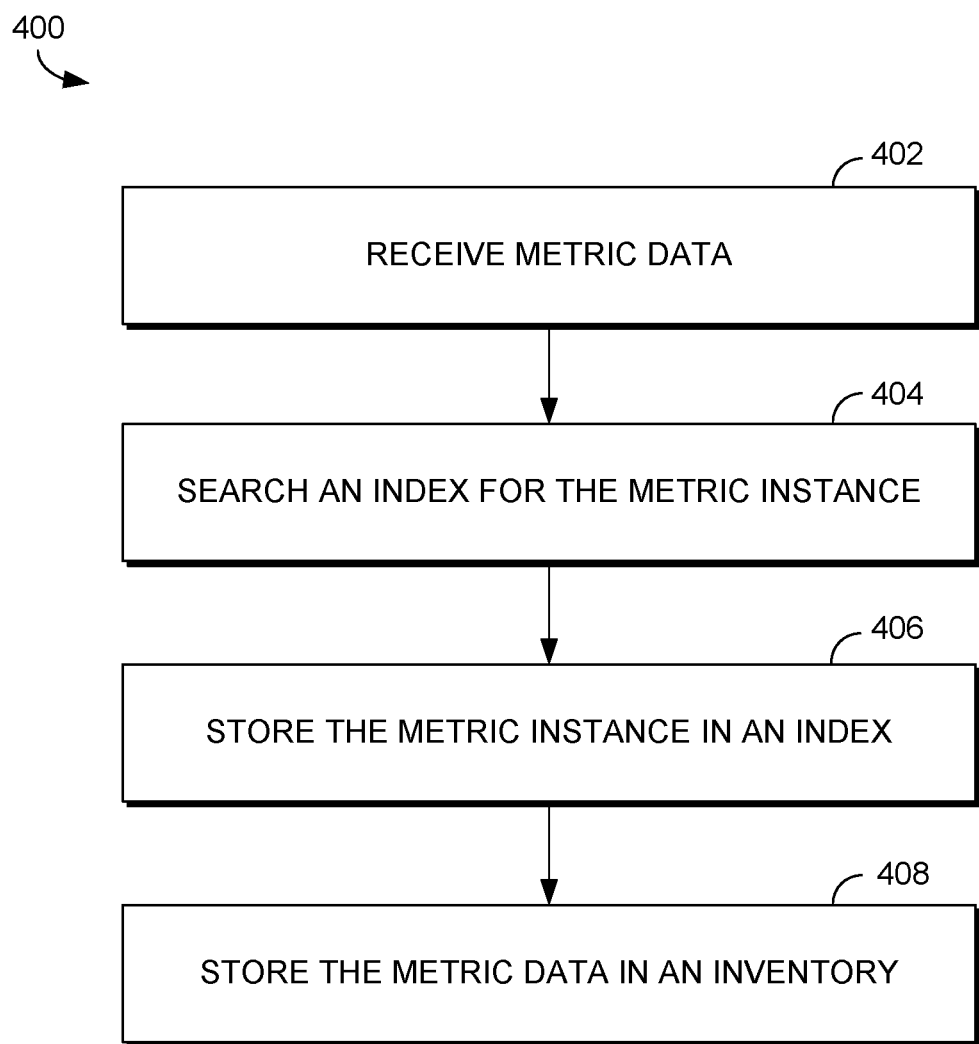
FIG. 4 a flow diagram is illustrated showing an exemplary method that stores metric data, in accordance with embodiments of the present disclosure.

Turning now to FIG. 4, a flow diagram showing an exemplary method 400 that stores metric data and/or the metric instance is illustrated in accordance with embodiments of the present disclosure. For instance, the method 400 may be employed utilizing the storage system 100 of FIG. 1. As shown at step 402, metric data corresponding to a component of the data center is received. The metric data may comprise and/or be associated with the metric instance that identifies the component of the data center. As shown at step 404, the index is searched to determine whether an entry for the metric instance exists in the index.

As shown at step 406, upon determining that the metric instance is not stored in the index, at least a portion of the metric instance can be stored in the index. In one embodiment, at least a portion of the metric instance can be stored in the index in a flattened format. Alternatively or additionally, the metric instance can be stored synchronously in the index. In a further embodiment, the metric data can be stored in the RDF model where the metric instance is stored as an index triple comprising the index subject 330, the index predicate 340, and the index object 350. The flattened format of the metric instance can be stored, for example, as the index object 350.

As shown at step 408, the metric data and/or the metric instance is stored in the inventory corresponding to the index. The metric data and/or the metric instance can be stored in the inventory in an unflattened format. In an exemplary embodiment, the metric data and/or the metric instance can be stored asynchronously in the inventory. Additionally or alternatively, the metric data and/or the metric instance can be stored in the inventory in the RDF model as an inventory triple comprising the inventory subject 360, the inventory predicate 370, and the inventory object 310. In one embodiment, the unflattened format of the metric instance related to a single component of the data-center may be represented by the inventory triple, where the inventory predicate 370 denotes the metric parameter and the inventory object 310 denotes the metric value. In a further embodiment, the unflattened format of the metric instance may be further represented by two or more inventory triples comprising the same inventory subject 360, yet distinct inventory predicates 370 and inventory objects 310, as illustrated in FIG. 3B.

Figure 5:
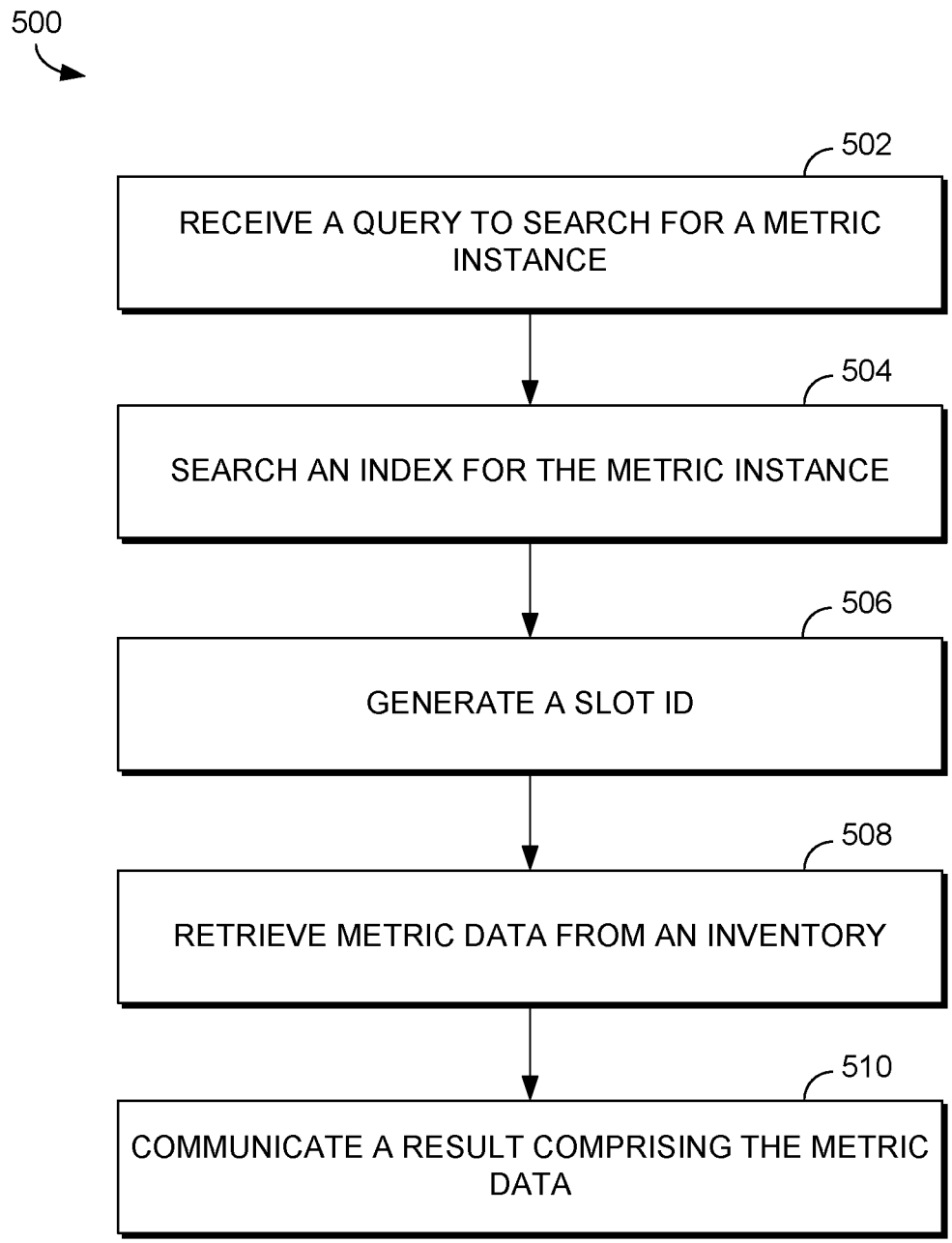
FIG. 5 a flow diagram is illustrated showing an exemplary method that retrieves metric data in accordance with embodiments of the present disclosure.

Turning now to FIG. 5, a flow diagram is illustrated showing an exemplary method 500 that retrieves metric data in accordance with embodiments of the present disclosure. As shown at step 502, a query to search for a metric instance is received. In one embodiment, the query received may be in an RDF query protocol and language.

As shown at step 504, the index may be search for the metric instance. For instance, the relationship between the metric parameter and metric value of the metric instance and/or the metric data is flattened. The relationship between the one or more metric parameters and metric values can be flattened as "MetricParameter/MetricValue" and/or "MetricParameter1/MetricValue1/MetricParameter2/MetricParameter2 . . . ." The index may be searched for the metric parameter and/or metric value. In one embodiment, step 504 may not be necessary as the metric instance of the metric data is already known without querying the index.

As shown at step 506, the slot identification is generated. In an exemplary embodiment, the slot identification may be generated by hashing the flattened format of at least a portion of the metric data. For instance, the slot identification may be generated using a consistent hash function. Accordingly, the slot identification may be generated using the following command: Hashing.consistentHash(MetricParameter1/MetricValue1/MetricParameter2/MetricParameter . . . ", slot), where any number of slots available across a key space (e.g., 2000) can be entered as the "slot". In one embodiment, the slot identification may be generated by hashing the flattened format of at least a portion of the metric data and/or metric instance.

As shown at step 508, the metric data is retrieved from the inventory. The metric data is retrieved based, at least in part, on the slot identification generated at Step 506. For example, the slot identification may be used to identify the location of the metric data, such as a server (e.g., IP address and port number), a particular database, and/or URI that identifies the location of the metric data. Referring back to FIG. 3B, in one embodiment, the slot identification may be incorporated into the inventory URI 308. The metric data corresponding to the inventory location can then be retrieved.

As shown at step 510, a result comprising the metric data for the metric instance may be communicated. In one embodiment, the query device 110 is communicatively coupled to the inventory server 160 through a communications network 140. As such, the result may be sent over the network 140 for display on a user interface associated with the query device 110. In another embodiment, where the query device 110 and inventory server 160 are the same device (not shown), the result may be communicated through the API.

Figure 6:
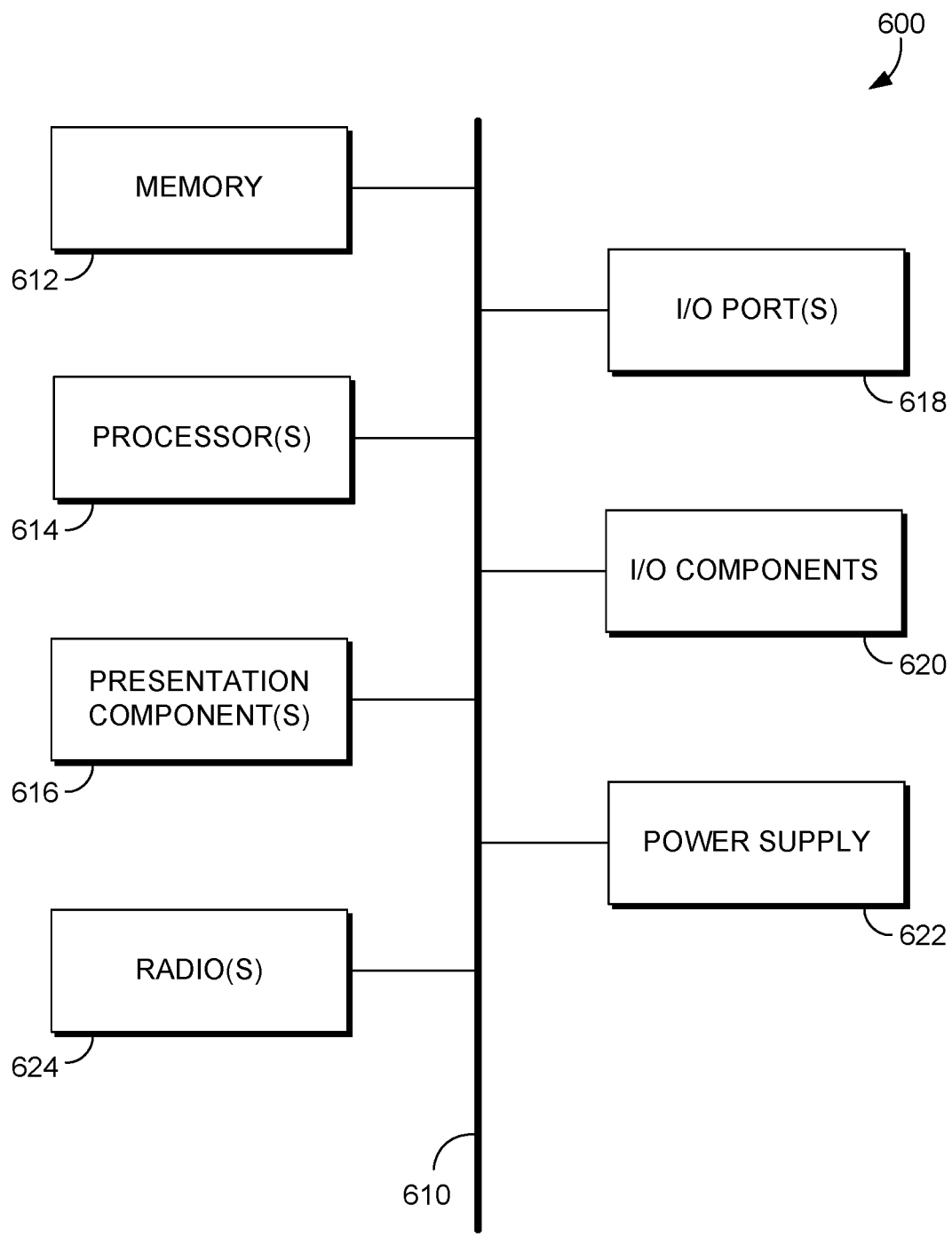
FIG. 6 is a block diagram of an exemplary computing environment suitable for use in implementing embodiments of the present disclosure.

Having described embodiments of the present disclosure, an exemplary operating environment in which embodiments of the present disclosure may be implemented is described below in order to provide a general context for various aspects of the present disclosure. Referring to FIG. 6 in particular, an exemplary operating environment for implementing embodiments of the present disclosure is shown and designated generally as computing device 600. Computing device 600 is but one example of a suitable computing environment and is not intended to suggest any limitation as to the scope of use or functionality of the inventive embodiments. Neither should the computing device 600 be interpreted as having any dependency or requirement relating to any one or combination of components illustrated.

The inventive embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The inventive embodiments may be practiced in a variety of system configurations, including handheld devices, consumer electronics, general-purpose computers, more specialty computing devices, etc. The inventive embodiments may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, one or more input/output (I/O) ports 618, one or more input/output (I/O) components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 10 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 1300 to render immersive augmented reality or virtual reality.

As can be understood, embodiments of the present disclosure provide for storing and retrieving metric data. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A method comprising:
receiving a query to search for metric data corresponding to a component of a datacenter, the component of the datacenter identified by a metric instance;
searching an index for the metric instance, the index comprising the metric instance synchronously stored in a flattened format, the flattened format of the metric instance stored as a single resource within a first Resource Description Framework (RDF) model;
determining a slot identification corresponding to the metric instance, the slot identification identifying a location of the metric data in an inventory;
based on the determined slot identification, retrieving the metric data from the inventory, the inventory comprising the metric data asynchronously stored in association with an unflattened format of the metric instance, the unflattened format of the metric instance stored as a plurality of resources within a second RDF model; and
communicating, to the query device, a query result comprising the metric data corresponding to the search.

2. The method of claim 1, wherein a uniform resource indicator of the second RDF model is associated with the slot identification.

3. The method of claim 2, wherein the query is received in an RDF query language.

4. The method of claim 1, wherein the slot identification is generated by applying a hash function to at least a portion of the metric instance.

5. The method of claim 4, wherein the hash function is a consistent hash function.

6. The method of claim 1, wherein a binary serialization protocol is utilized to communicate the query result.

7. The method of claim 1, wherein the index is stored at an index server and the inventory is stored at an inventory server.

8. The method of claim 1, further comprising utilizing a load balancing server to distribute the inventory to a plurality of inventory servers.

9. The method of claim 1, wherein the metric instance comprises a metric parameter and a metric value.

10. The method of claim 1, wherein the query is received via a batch request.

11. The method of claim 1, wherein the slot identification is generated by applying a hash function to at least a portion of the flattened format of the metric instance.

12. A computerized system:
a processor; and
a computer storage medium storing computer-useable instructions that, when used by the processor, cause the processor to:
receive a query to search for metric data corresponding to a component of a datacenter, the component of the datacenter identified in the query by a metric instance;
communicate the query to an index comprising the metric instance synchronously stored in a flattened format, the flattened format of the metric instance stored as a single resource within a first Resource Description Framework (RDF) model;
determining a slot identification utilizing at least a portion of the metric instance;
communicate the query to an inventory comprising the metric data asynchronously stored in association with an unflattened format of the metric instance, the unflattened format of the metric instance stored as a plurality of resources within a second RDF model, and the slot identification identifying the location of the metric data in the inventory; and
communicate a query result comprising the metric data corresponding to the query.

13. The system of claim 12, wherein the slot identification identifies the second RDF model to be searched.

14. The system of claim 13, wherein the query is received in an RDF query language.

15. The system of claim 12, wherein the query is based on a batch request.

16. The system of claim 12, wherein the slot identification is determined by applying a hash function to at least a portion of the metric instance.

17. The system of claim 12, wherein the slot identification is determined by applying a hash function to at least a portion of flattened format of the metric instance.

18. A computer storage medium storing computer-useable instructions that, when used by a computing device, cause the computing device to perform operations, the operations comprising:
receiving a query to search for metric data corresponding to a component of a datacenter, the component of the datacenter identified in the query by a metric instance;
communicating the query to an index comprising the metric instance synchronously stored in a flattened format, the flattened format of the metric instance stored as a single resource within a first Resource Description Framework (RDF) model;
determining a slot identification utilizing at least a portion of the metric instance;
communicating the query to an inventory comprising the metric data asynchronously stored in association with an unflattened format of the metric instance, the unflattened format of the metric instance stored as a plurality of resources within a second RDF model, and the slot identification identifying the location of the metric data in the inventory; and
receiving a query result comprising the metric data corresponding to the query.

19. The computer storage medium of claim 18, wherein the slot identification is determined by applying a hash function to at least a portion of flattened format of the metric instance.

20. The computer storage medium of claim 19, wherein the hash function is a consistent hash function.

21. The computer storage medium of claim 18, wherein a uniform resource indicator of the second RDF model is associated with the slot identification.

* * * * *